(12) United States Patent
Zhao et al.

(10) Patent No.: US 11,297,561 B2
(45) Date of Patent: Apr. 5, 2022

(54) ACCESS METHOD AND DEVICE FOR RADIO NETWORK

(71) Applicant: CHINA ACADEMY OF TELECOMMUNICATIONS TECHNOLOGY, Beijing (CN)

(72) Inventors: Yali Zhao, Beijing (CN); Chandrika Kumudinie Worrall, Beijing (CN); Li Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 53 days.

(21) Appl. No.: 16/323,252

(22) PCT Filed: May 18, 2017

(86) PCT No.: PCT/CN2017/084866
§ 371 (c)(1),
(2) Date: Feb. 4, 2019

(87) PCT Pub. No.: WO2018/024016
PCT Pub. Date: Feb. 8, 2018

(65) Prior Publication Data
US 2019/0174402 A1    Jun. 6, 2019

(30) Foreign Application Priority Data

Aug. 5, 2016    (CN) .......................... 201610635210.7

(51) Int. Cl.
| | |
|---|---|
| *H04W 48/16* | (2009.01) |
| *H04W 74/04* | (2009.01) |
| *H04W 76/27* | (2018.01) |
| *H04W 74/08* | (2009.01) |
| *H04W 76/11* | (2018.01) |
| *H04W 74/02* | (2009.01) |
| *H04W 80/02* | (2009.01) |

(Continued)

(52) U.S. Cl.
CPC ........... *H04W 48/16* (2013.01); *H04W 74/02* (2013.01); *H04W 74/04* (2013.01); *H04W 74/08* (2013.01);

(Continued)

(58) Field of Classification Search
None
See application file for complete search history.

(56) References Cited

U.S. PATENT DOCUMENTS

| | | | | |
|---|---|---|---|---|
| 2014/0334389 | A1* | 11/2014 | Abdel-Samad | ....... H04W 76/30 370/329 |
| 2016/0057800 | A1* | 2/2016 | Ingale | ................... H04W 76/10 370/216 |

(Continued)

FOREIGN PATENT DOCUMENTS

| | | |
|---|---|---|
| CN | 101478822 A | 7/2009 |
| CN | 102572937 A | 7/2012 |

(Continued)

OTHER PUBLICATIONS

3GPP TR 38.801, VO. 1.0, Apr. 2016, 3rd Generation Partnership Project, Technical Specification Group Radio Access Network, Study on New Radio Access Technology, Radio Access Architecture and Interfaces (Release 14) (Year: 2016).*

(Continued)

*Primary Examiner* — Gregory B Sefcheck
*Assistant Examiner* — Amarnauth G Persaud
(74) *Attorney, Agent, or Firm* — Ladas & Parry, LLP

(57) ABSTRACT

An access method and an access device for a radio network are provided. The access method includes: receiving, by a distributed processing node, an Msg1 message from a UE, the Msg1 message including a dedicated access code or sequence; and transmitting, by the distributed processing node, an Msg2 message configured to respond to the Msg1

(Continued)

message to the UE, the Msg2 message including a temporary RNTI which is a currently-unused RNTI in a set of RNTIs available for the distributed processing node.

20 Claims, 7 Drawing Sheets

(51) Int. Cl.
 *H04W 88/02* (2009.01)
 *H04W 88/08* (2009.01)
(52) U.S. Cl.
 CPC ........ *H04W 74/0833* (2013.01); *H04W 76/11* (2018.02); *H04W 76/27* (2018.02); *H04W 80/02* (2013.01); *H04W 88/023* (2013.01); *H04W 88/085* (2013.01)

(56) References Cited

U.S. PATENT DOCUMENTS

| | | | |
|---|---|---|---|
| 2018/0070383 A1* | 3/2018 | Fujishiro | H04W 72/12 |
| 2018/0249508 A1* | 8/2018 | Gao | H04L 5/0053 |
| 2019/0357126 A1* | 11/2019 | Marinier | H04W 56/001 |

FOREIGN PATENT DOCUMENTS

| | | |
|---|---|---|
| CN | 2012177060 A2 | 12/2012 |
| CN | 103533663 A | 1/2014 |
| CN | 103906043 A | 7/2014 |
| CN | 105792371 A | 7/2016 |
| EP | 3273612 A1 | 1/2018 |
| EP | 3567923 A1 | 11/2019 |
| WO | 2010069263 A1 | 6/2010 |
| WO | 2012177060 A2 | 12/2012 |
| WO | 2014204365 A1 | 12/2014 |

OTHER PUBLICATIONS

International Search Report for PCT/CN2017/084866 dated Aug. 22, 2017 and its English translation provided by WIPO.

Written Opinion of the International Search Authority for PCT/CN2017/084866 dated Aug. 22, 2017 and its English translation provided by Google Translate.

Communication pursuant to Article 94(3) EPC from EP app. No. 17836200.0, dated Mar. 1, 2021.

* cited by examiner

ACCESS METHOD AND DEVICE FOR RADIO NETWORK

CROSS-REFERENCE TO RELATED APPLICATIONS

This present application is the U.S. national phase of PCT/CN2017/084866 filed on May 18, 2017, which claims priority to Chinese Patent Application No. 201610666157.7 filed on Aug. 5, 2016, the disclosures of which are incorporated by reference herein.

TECHNICAL FIELD

The present disclosure relates to the field of communication technology, in particular to an access method and an access method for a radio network.

BACKGROUND

For a Long Term Evolution (LTE) system, there mainly exist the following circumstances for a random access procedure: (1) access from RRC_IDLE (also called as initial access); (2) the initialization of Radio Resource Control (RRC) connection reestablishment when a radio link fails (also one type of the initial access); (3) random access during the handover; (4) the arrival of downlink data at a User Equipment (UE) in a RRC_CONNECTED state; and (5) the arrival of uplink data at the UE in the RRC_CONNECTED state.

For the above circumstances (3) and (4), when there is a dedicated preamble, a non-contention random access procedure may be adopted. FIG. 1 shows the non-contention random access procedure, which mainly includes the following three steps.

Msg0: a base station allocates fir the UE a ra-PreambleIndex dedicated for the non-contention random access procedure and a Physical Random Access Channel (PRACH) resource ra-PRACH-MaskIndex for the random access procedure. For the non-contention random access procedure due to the arrival of the downlink data, the information is carried in a Physical Downlink Control Channel (PDCCH), and for the non-contention random access procedure due to the handover, the information is carried in a handover command.

Msg1: the UE transmits to the base station the dedicated preamble on a dedicated PRACH resource based on the ra-PreambleIndex and the ra-PRACH-MaskIndex indicated in Msg0. Upon the receipt of the Msg1, the base station calculates an uplink Timing Advance (TA) based on the Msg1.

Msg2: the base station transmits to the UE a random access response comprising TA information, so as to notify the UE of the TA for the subsequence uplink transmission.

In the other circumstances, a contention random access procedure may be adopted. FIG. 2 shows the contention random access procedure, which mainly includes the following four steps.

Msg1: the UE selects a random access preamble and a PRACH resource, and transmits to the base station the selected random access preamble on the PRACH resource.

Msg2: the base station receives the random access preamble, calculates the TA, and transmits to the UE a random access response at least comprising TA information about a temporary Cell-Radio Network Temporary Identifier (C-RNTI) and Uplink (UL) grant with respect to an Msg3 message.

Msg3: the UE performs the uplink transmission on the UL grant specified in Msg2. The Msg3 messages corresponding to the random access procedures triggered in different circumstances may carry different contents. For example, for the initial access, a RRC connection establishment request is carried in the Msg3 message.

Msg4: upon the receipt of a contention resolution message, the UE determines whether the random access procedure is performed successfully based on Msg4.

For the LTE system in the related art, the random access procedure is designed with respect to single-layered access network nodes, i.e., the entire signaling interaction for the random access procedure is generated between the base station and the UE.

For a $5^{th}$-Generation (5G) system, the access network nodes are layered, so how to perform the access procedure in this access network structure needs to be taken into consideration. When a distributed processing node merely has a function of a physical layer and the other functions are achieved by a centralized processing node, as the simplest way, the random access procedure in the LTE system in the related art may be adopted, i.e., the entire signaling interaction for the random access procedure is generated between the UE and the centralized processing node. However, when the distributed processing node has a part of L2 functions, how to perform the signaling interaction for the random access procedure needs to be taken into consideration, so as to shorten an access time delay and optimize the system performance.

Currently, the research on the 5G technology is still at a primary stage, and there is publicly no scheme for the access procedure in layered access network architecture.

SUMMARY

An object of the present disclosure is to provide an access method and an access device fora radio network, so as to achieve the access procedure in the layered access network architecture.

In one aspect, the present disclosure provides in some embodiments an access method for a radio network, including: receiving, by a distributed processing node, an Msg1 message from a UE, the Msg1 message including a dedicated access code or sequence; and transmitting, by the distributed processing node, an Msg2 message configured to respond to the Msg1 message to the UE, the Msg2 message including a temporary RNTI which is a currently-unused RNTI in a set of RNTIs available for the distributed processing node.

In some embodiments of the present disclosure, subsequent to transmitting, by the distributed processing node, the Msg2 message configured to respond to the Msg1 message to the UE, the access method further includes: receiving, by the distributed processing node, an Msg3 message from the UE, the Msg3 message including a content corresponding to a random access reason; and parsing, by the distributed processing node, the Msg3 message, and performing treatment based on a parsing result.

In some embodiments of the present disclosure, the parsing, by the distributed processing node, the Msg3 message and performing treatment based on the parsing result includes: parsing, by the distributed processing node, the Msg3 message, the Msg3 message including an RNTI Medium Access Control (MAC) Control Element (CE) corresponding to an RNTI currently adopted by the UE for the data transmission; and transmitting, by the distributed processing node, an Msg4 message to the UE, the Msg4 message being addressed through the RNTI.

In some embodiments of the present disclosure, the parsing, by the distributed processing node, the Msg3 message and performing treatment based on the parsing result includes: parsing, by the distributed processing node, the Msg3 message, the Msg3 message including RRC connection establishment/reestablishment request identification information; transmitting, by the distributed processing node, an Msg4a message to the UE, the Msg4a message including the RRC connection establishment/reestablishment request identification information; transmitting, by the distributed processing node, an Msg3a message to a centralized processing node, the Msg3a message including the RRC connection establishment/reestablishment request identification information; receiving, by the distributed processing node, an Msg4b message configured to respond to the Msg3a message from the centralized processing node; and transmitting, by the distributed processing node, an Msg5 message configured to respond to the Msg3 message to the UE.

In some embodiments of the present disclosure, the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node. Sets of RNTIs available for different distributed processing nodes managed by the centralized processing node do not overlap each other.

In some embodiments of the present disclosure, the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, the access method further includes, when the Msg3 message includes the RRC connection establishment/reestablishment request identification information, notifying, by the distributed processing node, the centralized processing node of the RRC connection establishment/reestablishment request identification information and the temporary RNTI via an interface between the distributed processing node and the centralized processing node, so that the centralized processing node takes a combination of the temporary RNTI and a Transmission Reception Point (TRP) Identity (ID) of the distributed processing mode as an identifier of the UE in the centralized processing node.

In another aspect, the present disclosure provides in some embodiments an access method for a radio network, including receiving, by a UE, an Msg2 message from a distributed processing node, the Msg2 message including a temporary RNTI which is a currently-unused RNTI in a set of RNTIs available for the distributed processing node.

In some embodiments of the present disclosure, the access method further includes: transmitting, by the UE, an Msg3 message to the distributed processing node, the Msg3 message including an RNTI MAC CE corresponding to an RNTI currently adopted by the UE for the data transmission; and receiving, by the UE, an Msg4 message from the distributed processing node, the Msg4 message being addressed through the RNTI.

In some embodiments of the present disclosure, the access method further includes: transmitting, by the UE, the Msg3 message to the distributed processing node, the Msg3 message including RRC connection establishment/reestablishment request identification information; when the UE has received an Msg4a message from the distributed processing node within a predetermined time period and the Msg4a message includes the RRC connection establishment/reestablishment request identification information transmitted by the UE in the Msg3 message, determining that the competition is successful; receiving, by the UE, an Msg5 message configured to respond to the RRC connection establishment/reestablishment request identification information in the Msg3 message from the distributed processing node; and when the UE fails to receive an Msg4a message from the distributed processing node within the predetermined time period, re-initiating, by the UE, a random access procedure.

In some embodiments of the present disclosure, the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node, Sets of RNTIs available for different distributed processing nodes managed by the centralized processing node do not overlap each other.

In some embodiments of the present disclosure, the access method further includes: when the Msg3 message includes the RRC connection establishment/reestablishment request identification information and the UE has determined that the competition is successful based on the Msg4a, taking, by the UE, the temporary RNTI as an RNTI for the subsequent data transmission; or when the Msg3 message includes the RRC connection establishment/reestablishment request identification information, enabling the UE to adopt the temporary RNTI prior to the reception of the an RRC connection establishment/reestablishment message; and when the UE has received the RRC connection establishment/reestablishment message transmitted by the centralized processing node through, the distributed processing node, releasing, by the UE, the temporary RNTI, and taking an RNTI allocated by a network side device for the UE in the RRC connection establishment/reestablishment message as an RNTI adopted by the UL for the subsequent data transmission.

In some embodiments of the present disclosure, the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, when the Msg3 message includes the RRC connection establishment/reestablishment request identification information, the access method further includes: receiving, by the UE, the RRC connection establishment/reestablishment message transmitted by the centralized processing node through the distributed processing node; when the RRC connection establishment/reestablishment message includes a newly-allocated RNTI, releasing, by the UE, the temporary RNTI, and taking the newly-allocated RNTI as the RNTI adopted by the UE for the subsequent data transmission; and when the RRC connection establishment/reestablishment message does not include any newly-allocated RNTI, taking, by the UE, the temporary RNTI as a new RNTI, and taking the new RNTI as the RNTI adopted by the UE for the subsequent data transmission.

In yet another aspect, the present disclosure provides in some embodiments an access method for a radio network, including: receiving, by a distributed processing node, an Msg1 message from a UE, a content included in the Msg1 message being allocated through an Msg0 message; processing, by the distributed processing node, the Msg1 message from the UE, and generating an Msg2 message corresponding to the Msg1 message, the Msg2 message including a temporary RNTI which is a currently-unused RNTI in a set of RNTIs available for the distributed processing node; and transmitting, by the distributed processing node, the Msg2 message to the UE.

In some embodiments of the present disclosure, the set of RNTIs available for the distributed processing node is determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

In some embodiments of the present disclosure, the Msg0 message is generated by the centralized processing node or the distributed processing node.

In still yet another aspect, the present disclosure provides in some embodiments an access method for a radio network, including: transmitting, by a UE, an Msg1 message to a distributed processing node, a content included in the Msg1 message being allocated through an Msg0 message; and receiving, by the UE, an Msg2 message from the distributed processing node, the Msg2 message including a temporary RNTI which is a currently-unused RNTI in a set of RNTIs available for the distributed processing node.

In some embodiments of the present disclosure, the access method further includes discarding, by the UE, the temporary RNTI included in the Msg2 message, and adopting a C-RNTI acquired based on the Msg0 message.

In some embodiments of the present disclosure, the set of RNTIs available for the distributed processing node is determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

In still yet another aspect, the present disclosure provides in some embodiments a distributed processing node, including: a first reception module configured to receive an Msg1 message from a UE, the Msg1 message including a dedicated access code or sequence; and a first transmission module configured to transmit an Msg2 message configured to respond to the Msg1 message to the UE, the Msg2 message including a temporary RNTI which is a currently-unused RNTI in a set of RNTIs available for the distributed processing node.

In some embodiments of the present disclosure, the distributed processing node further includes: a second reception module configured to receive an Msg3 message from the UE, the Msg3 message including a content corresponding to a random access reason; and a processing module configured to parse the Msg3 message, and perform treatment based on a parsing result.

In some embodiments of the present disclosure the processing module is further configured to: parse the Msg3 message, the Msg3 message including an RNTI MAC CE corresponding to an RNTI currently adopted by the UE for the data transmission; and transmit an Msg4 message to the UE, the Msg4 message being addressed through the RNTI.

In some embodiments of the present disclosure, the processing module is further configured to: parse the Msg3 message, the Msg3 message including RRC connection establishment/reestablishment request identification information; transmit an Msg4a message to the UE, the Msg4a message including the RRC connection establishment/reestablishment request identification information; transmit an Msg3a message to a centralized processing node, the Msg3a message including the RRC connection establishment/reestablishment request identification information; receive an Msg4b message configured to respond to the Msg3a message from the centralized processing node; and transmit an Msg5 message configured to respond to the Msg3 message to the UE.

In some embodiments of the present disclosure, the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node. Sets of RNTIs available for different distributed processing nodes managed by the centralized processing node do not overlap each other.

In some embodiments of the present disclosure, the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, the distributed processing node further includes a notification module configured to, when the Msg3 message includes the RRC connection establishment/reestablishment request identification information, notify the centralized processing node of the RRC connection establishment/reestablishment request identification information and the temporary RNTI via an interface between the distributed processing node and the centralized processing node, so that the centralized processing node takes a combination of the temporary RNTI and a TRP ID of the distributed processing mode as an identifier of the UE in the centralized processing node.

In still yet another aspect, the present disclosure provides in some embodiments a UE, including a third reception module configured to receive an Msg2 message from a distributed processing node, the Msg2 message including a temporary RNTI which is a currently-unused RNTI in a set of RNTIs available for the distributed processing node.

In some embodiments of the present disclosure, the UE further includes: a second transmission module configured to transmit an Msg3 message to the distributed processing node, the Msg3 message including an RNTI MAC CE corresponding to an RNTI currently adopted by the UE for the data transmission; and a fourth reception module configured to receive an Msg4 message from the distributed processing node, the Msg4 message being addressed through the RNTI.

In some embodiments of the present disclosure, the UE further includes: a third transmission module configured to transmit the Msg3 message to the distributed processing node, the Msg3 message including RRC connection establishment/reestablishment request identification information; a fifth reception module configured to, when the UE has received an Msg4a message from the distributed processing node within a predetermined time period and the Msg4a message includes the RRC connection establishment/reestablishment request identification information transmitted by the UE in the Msg3 message, determine that the competition is successful; a sixth reception module configured to receive an Msg5 message configured to respond to the RRC connection establishment/reestablishment request identification information in the Msg3 message from the distributed processing node; and an re-initiation module configured to, when the UE fails to receive an Msg4a message from the distributed processing node within the predetermined time period, re-initiate a random access procedure.

In some embodiments of the present disclosure, the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node. Sets of RNTIs available for different distributed processing nodes managed by the centralized processing node do not overlap each other.

In some embodiments of the present disclosure, the UE further includes an RNTI selection module configured to: when the Msg3 message includes the RRC connection establishment/reestablishment request identification information and the UE has determined that the competition is successful based on the Msg4a, take the temporary RNTI as an RNTI for the subsequent data transmission; or when the Msg3 message includes the RRC connection establishment/reestablishment request identification information, enable the UE to adopt the temporary RNTI prior to the reception of the an RRC connection establishment/reestablishment message; and when the UE has received the RRC connection establishment/reestablishment message transmitted by the centralized processing node through the distributed processing node, release the temporary RNTI, and take an RNTI allocated by a network side device for the UE in the RRC connection establishment/reestablishment message as an RNTI adopted by the UE for the subsequent data transmission.

In some embodiments of the present disclosure, the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, the UE further includes: a fifth transmission module configured to receive the RRC connection establishment/reestablishment message transmitted by the centralized processing node through the distributed processing node; a releasing module configured to, when the RRC connection establishment/reestablishment message includes a newly-allocated RNTI, release the temporary RNTI, and take the newly-allocated RNTI as the RNTI adopted by the UE for the subsequent data transmission; and an updating module configured to, when the RRC connection establishment/reestablishment message does not include any newly-allocated RNTI, take the temporary RNTI as a new RNTI, and take the new RNTI as the RNTI adopted by the UE for the subsequent data transmission.

In still yet another aspect, the present disclosure provides in some embodiments a distributed processing node, including: a seventh reception module configured to receive an Msg1 message from a UE, a content included in the Msg1 message being allocated through an Msg0 message; a message generation module configured to process the Msg1 message from the UE, and generate an Msg2 message corresponding to the Msg1 message, the Msg2 message including a temporary RNTI which is a currently-unused RNTI in a set of RNTIs available for the distributed processing node; and a fourth transmission module configured to transmit the Msg2 message to the UE.

In some embodiments of the present disclosure, the set of RNTIs available for the distributed processing node is determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

In some embodiments of the present disclosure, the Msg0 message is generated by the centralized processing node or the distributed processing node.

In still yet another aspect, the present disclosure provides in some embodiments a UE, including: a fifth transmission module configured to transmit an Msg1 message to a distributed processing node, a content included in the Msg1 message being allocated through an Msg0 message; and an eighth reception module configured to receive an Msg2 message from the distributed processing node, the Msg2 message including a temporary RNTI which is a currently-unused RNTI in a set of RNTIs available for the distributed processing node.

In some embodiments of the present disclosure, the UE further includes a discarding module configured to discard the temporary RNTI included in the Msg2 message, and adopt a C-RNTI acquired based on the Msg0 message.

In some embodiments of the present disclosure, the set of RNTIs available for the distributed processing node is determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

In still yet another aspect, the present disclosure provides in some embodiments a distributed processing node, including a processor, a memory and a transceiver. The processor is configured to read a program stored in the memory to: receive through the transceiver an Msg1 message from a UE, the Msg1 message including a dedicated access code or sequence; and transmit an Msg2 message configured to respond to the Msg1 message to the UE, the Msg2 message including a temporary RNTI which is a currently-unused RNTI in a set of RNTIs available for the distributed processing node. The transceiver is configured to receive and transmit data. The memory is configured to store therein data for the operation of the processor.

In still yet another aspect, the present disclosure provides in some embodiments a UE, including a processor, a memory and a transceiver. The processor is configured to read a program stored in the memory to receive through the transceiver an Msg2 message from a distributed processing node, the Msg2 message including a temporary RNTI which is a currently-unused RNTI in a set of RNTIs available for the distributed processing node. The transceiver is configured to receive and transmit data. The memory is configured to store therein data for the operation of the processor.

In still yet another aspect, the present disclosure provides in some embodiments a distributed processing node, including, a processor, a memory and a transceiver. The processor is configured to read a program stored in the memory to: receive through the transceiver an Msg1 message from a UE, a content included in the Msg1 message being allocated through an Msg0 message; process the Msg1 message from the UE, and generate an Msg2 message corresponding to the Msg1 message, the Msg2 message including a temporary RNTI which is a currently-unused RNTI in a set of RNTIs available for the distributed processing node; and transmit through the transceiver the Msg2 message to the UE. The transceiver is configured to receive and transmit data. The memory is configured to store therein data for the operation of the processor.

In still yet another aspect, the present disclosure provides in some embodiments a UE, including a processor, a memory and a transceiver. The processor is configured to read a program stored in the memory to: transmit through the transceiver an Msg1 message to a distributed processing node, a content included in the Msg1 message being allocated through an Msg0 message; and receive through the transceiver an Msg2 message from the distributed processing node, the Msg2 message including a temporary RNTI which is a currently-unused RNTI in a set of RNTIs available for the distributed processing node. The transceiver is configured to receive and transmit data. The memory is configured to store therein data for the operation of the processor.

According to the embodiments of the present disclosure, it is able to perform the access procedure in the layered access network architecture, and provide a small access time delay for the access procedure. In addition, it is able to support the UE to rapidly determine the failure of contention, thereby to enable the UE to re-initiate the random access procedure.

BRIEF DESCRIPTION OF THE DRAWINGS

In order to illustrate the technical solutions of the present disclosure or the related art in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

It should be appreciated that, the present disclosure may be implemented as a system, an apparatus, a device, a method or a computer program product. Hence, the present disclosure may be implemented in the form of full hardware, full software (including firmware, resident software or microcode), or a combination thereof.

Ultra-dense networking is a development trend of a future mobile communication system. In order to achieve the unified management over a huge quantity of distributed processing nodes at a control plane, it is necessary for a centralized processing node to achieve a part of protocol functions. At this time, double-layered architecture consisting of the centralized processing node and the distributed processing nodes may be formed. Each distributed processing node may also be called as Transmission Reception Point (TRP), and the centralized processing node may also be called as Central Unit (CU) or New Radio Access Technology (RAT) evolved Node B (NR eNB). Depending on different functions, the centralized processing node may include a control plane and a user plane.

Figure 1:
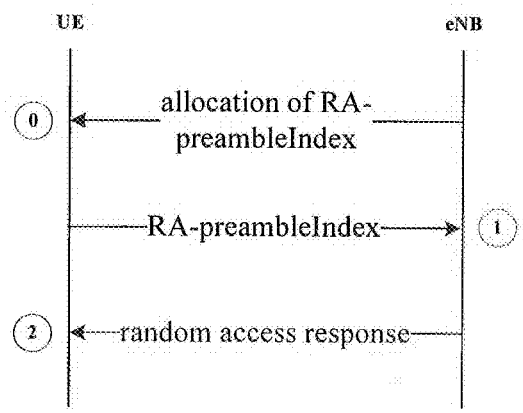
FIG. 1 is a schematic view showing a non-contention random access procedure in the related art.
Figure 2:
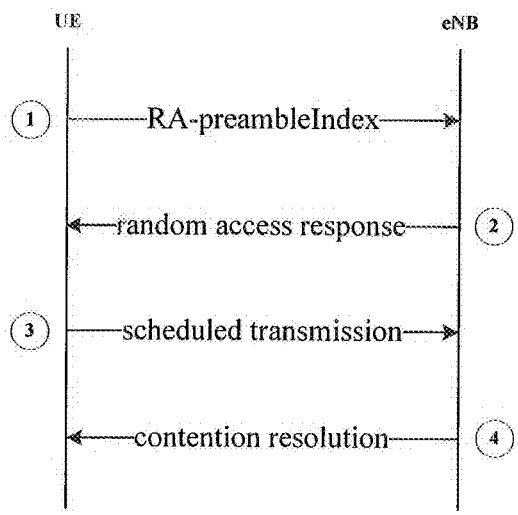
FIG. 2 is a schematic view showing a contention random access procedure in the related art.
Figure 3:
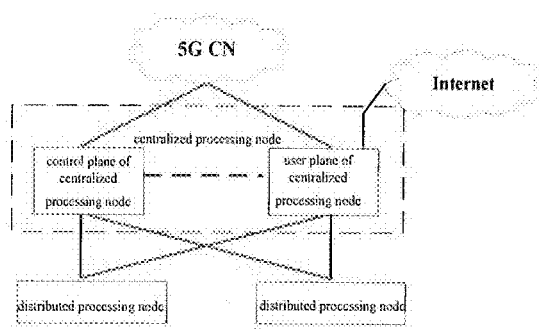
FIG. 3 is a schematic view showing layered network architecture in future.

Based on the above description, FIG. 3 shows the network architecture for the future mobile communication system. In the embodiments of the present disclosure, the distributed processing node may be, but not limited to, the TRP or the like, and the centralized processing node may be, but not limited to, the NR eNB, the CU or the like.

Figure 4:
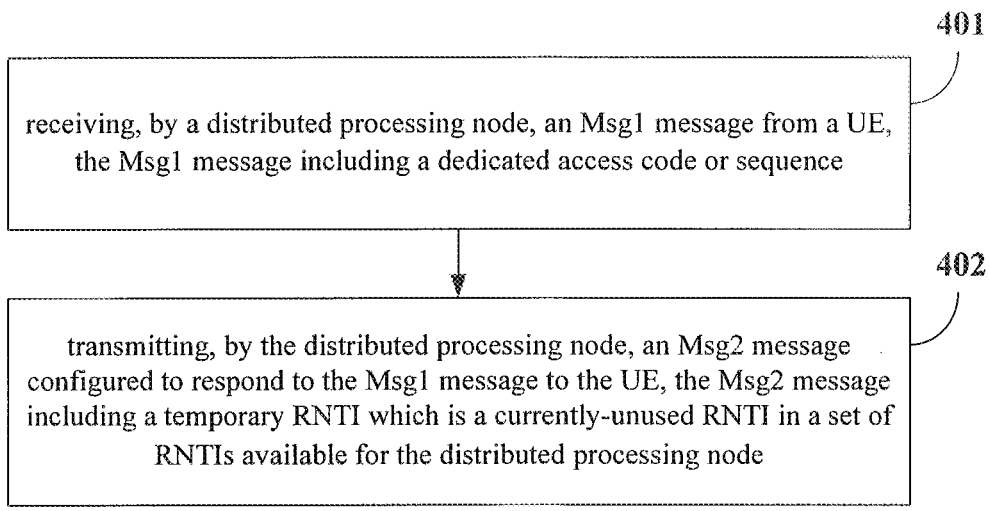
FIG. 4 is a flow chart of an access method for a radio network in some embodiments of the present disclosure.

The present disclosure provides in some embodiments an access for a radio network which is adapted to a distributed processing node in layered network architecture. The layered network architecture further includes a centralized processing node. As shown in FIG. 4, the access method includes: Step 401 of receiving, by the distributed processing node, an Msg1 message from a UE, the Msg1 message including a dedicated access code or sequence; and Step 402 of transmitting, by the distributed processing node, an Msg2 message configured to respond to the Msg1 message to the UE, the Msg2 message including a temporary RNTI which is a currently-unused RNTI in a set of RNTIs available for the distributed processing node.

In some embodiments of the present disclosure, subsequent to transmitting, by the distributed processing node, the Msg2 message configured to respond to the Msg1 message to the UE, the access method further includes: receiving, by the distributed processing node, an Msg3 message from the UE, the Msg3 message including a content corresponding to a random access reason; and parsing, by the distributed processing node, the Msg3 message, and performing treatment based on a parsing result.

It should be appreciated that, the content included in the Msg3 message may vary along with a purpose of a random access procedure. For example, in a content random access scenario, the content included in the Msg3 message may be, but not limited to, an MAC CE corresponding, to a RNTI currently adopted by the UE for the data transmission, or RRC connection establishment/reestablishment request identification information (e.g., Common Control Channel (CCH) Service Data Unit (SDU) carried in the Msg3 message).

In addition, in an LTE system, the random access procedure may be triggered in various circumstances, e.g., initial access, handover, RRC connection reestablishment, the arrival of uplink/downlink data with uplink out-of-synchronization, and positioning. The content carried in the Msg3 message may vary in different circumstances. For example, for the initial access/RRC connection reestablishment, the CCCH SDU may be carried in the Msg3 message; for the handover, a C-RNTI MAC CE may be carried in the Msg3 message; and in the other circumstances, at least the C-RNTI MAC CE may be carried in a handover message.

In some embodiments of the present disclosure, the parsing, by the distributed processing node, the Msg3 message and performing treatment based on the parsing result includes: parsing, by the distributed processing node, the Msg3 message, the Msg3 message including an RNTI MAC CE corresponding to an RNTI currently adopted by the UE for the data transmission; and transmitting, by the distributed processing node, an Msg4 message to the UE, the Msg4 message being addressed through the RNTI.

In some embodiments of the present disclosure, the parsing, by the distributed processing node, the Msg3 message and performing treatment based on the parsing result includes: parsing, by the distributed processing node, the Msg3 message, the Msg3 message including RRC connection establishment/reestablishment request identification information; transmitting, by the distributed processing node, an Msg4a message to the UE, the Msg4a message including the RRC connection establishment/reestablishment request identification information; transmitting, by the distributed processing node, an Msg3a message to a centralized processing node, the Msg3a message including the RRC connection establishment/reestablishment request identification information; receiving, by the distributed processing node, an Msg4b message configured to respond to the Msg3a message from the centralized processing node; and transmitting, by the distributed processing node, an Msg5 message configured to respond to the Msg3 message to the UE.

In the embodiments of the present disclosure, the distributed processing node may notify in advance the UE of whether the competition is successful through the Msg4a message, so as to enable the UE which does not perform the content successfully to try again in advance.

In some embodiments of the present disclosure, the set of RNTIs available for the distributed processing node may be determined in the following modes.

Mode 1: the centralized processing node may determine a set of RNTIs available for the centralized processing node, and allocate a subset of the set of RNTIs to each distributed processing node managed by the centralized processing node as the set of RNTIs available for the distributed processing node. Sets of RNTIs available for different distributed processing nodes managed by the centralized processing node do not overlap each other.

Mode 2: the centralized processing node may determine a set of RNTIs available for the centralized processing node, and allocate a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, based on the above-mentioned Mode 2 the access method further includes, when the Msg3 message includes the RRC connection establishment/reestablishment request identification information, notifying, by the distributed processing node, the centralized processing node of the RRC connection establishment/reestablishment request identification information and the temporary RNTI via an interface between the distributed processing node and the centralized processing node, so that the centralized processing node takes a combination of the temporary RNTI and a TRP ID of the distributed processing mode as an identifier of the UE in the centralized processing node.

In the embodiments of the present disclosure, the Msg1 message, the Msg2 message, the Msg3 message and the Msg4 message are all generated between the UE and the distributed processing node.

With respect to the RRC connection establishment/reestablishment, the distributed processing node needs to parse the Msg3 message, extract the RRC connection establishment/reestablishment request identification information (e.g., the CCCH SDU carried in the Msg3 message), and transmit the RRC connection establishment/reestablishment request identification information to the centralized processing node via an interface between the distributed processing node and the centralized processing node. Next, the centralized processing node may make a decision on the RRC connection establishment/reestablishment, and transmit a response message to the distributed processing node. Then, the distributed processing node may forward the response message to the UE.

According to the access method in the embodiments of the present disclosure, it is able to perform the access procedure in the layered access network architecture, and provide a small access time delay for the access procedure. In addition, it is able to support the UE to rapidly determine the failure of contention, thereby to enable the UE to re-initiate the random access procedure.

Figure 5:
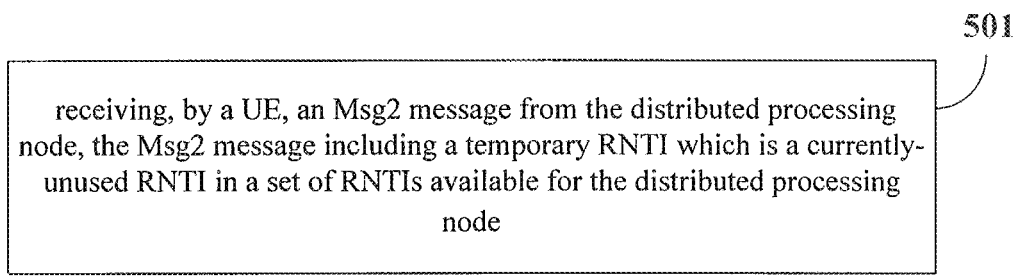
FIG. 5 is a flow chart of an access method for a radio network in some embodiments of the present disclosure.

The present disclosure further provides in some embodiments an access method, for a radio network which is adapted to a UE in layered network architecture. The layered network architecture further includes a centralized processing node and a distributed processing node. As shown in FIG. 5, the access method includes Step 501 of receiving, by the UE, an Msg message from the distributed processing node, the Msg2 message including a temporary RNTI which is a currently-unused RNTI in a set of RNTIs available for the distributed processing node.

In some embodiments of the present disclosure, prior to Step 501, the UE may transmit the Msg1 message to the distributed processing node, and the Msg1 message may include a dedicated access code or sequence.

In some embodiments of the present disclosure, the access method further includes: transmitting, by the UE, an Msg3 message to the distributed processing node, the Msg3 message including an RNTI MAC CE corresponding to an RNTI currently adopted by the UE for the data transmission; and receiving, by the UE, an Msg4 message from the distributed processing node, the Msg4 message being addressed through the RNTI.

In some embodiments of the present disclosure, the access method further includes: transmitting, by the UE, the Msg3 message to the distributed processing node, the Msg3 message including RRC connection establishment/reestablishment request identification information; when the UE has received an Msg4a message from the distributed processing node within a predetermined time period (e.g., before the timeout of a contention resolution timer) and the Msg4a message includes the RRC connection establishment/reestablishment request identification information transmitted by the UE in the Msg3 message, determining that the competition is successful; receiving, by the UE, an Msg5 message configured to respond to the RRC connection establishment/reestablishment request identification information in the Msg3 message from the distributed processing node; and when the UE fails to receive an Msg4a message from the distributed processing node within the predetermined time period (e.g., before the timeout of the contention resolution timer), re-initiating, by the UE, a random access procedure as soon as possible based on a backoff mechanism.

In some embodiments of the present disclosure, the set of RNTIs available for the distributed processing node may be determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node. Sets of RNTIs available for different distributed processing nodes managed by the centralized processing node do not overlap each other.

In some embodiments of the present disclosure, based on the above-mentioned determination mode, the access method further includes: when the Msg3 message includes the RRC connection establishment/reestablishment request identification information and the UE has determined that the competition is successful based on the Msg4a, taking, by the UE, the temporary RNTI as an RNTI for the subsequent data transmission; or when the Msg3 message includes the RRC connection establishment/reestablishment request identification information, enabling the UE to adopt the temporary RNTI prior to the reception of the an RRC connection establishment/reestablishment message: and when the UE has received the RRC connection establishment/reestablishment message transmitted by the centralized processing node through the distributed processing node, releasing, by the UE, the temporary RNTI, and taking an RNTI allocated by a network side device for the UE in the RRC connection establishment/reestablishment message as an RNTI adopted by the UE for the subsequent data transmission.

In some embodiments of the present disclosure, the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, based on the above-mentioned determination mode, when the Msg3 message includes the RRC connection establishment/reestablishment request identification information, the access method further includes: receiving, by the UE, the RRC connection establishment/reestablishment message transmitted by the centralized processing node through the distributed processing node; when the RRC connection establishment/reestablishment message includes a newly-allocated RNTI, releasing, by the UE, the temporary RNTI, and taking the newly-allocated RNTI as the RNTI adopted by the UE for the subsequent data transmission; and when the RRC connection establishment/reestablishment message does not include any newly-allocated RNTI, taking, by the UE, the temporary RNTI as a new RNTI, and taking the new RNTI as the RNTI adopted by the UE for the subsequent data transmission.

According to the access method in the embodiments of the present disclosure, it is able to perform the access procedure in the layered access network architecture, and provide a small access time delay for the access procedure. In addition, it is able to support the UE to rapidly determine the failure of contention, thereby to enable the UE to re-initiate the random access procedure.

Figure 6:
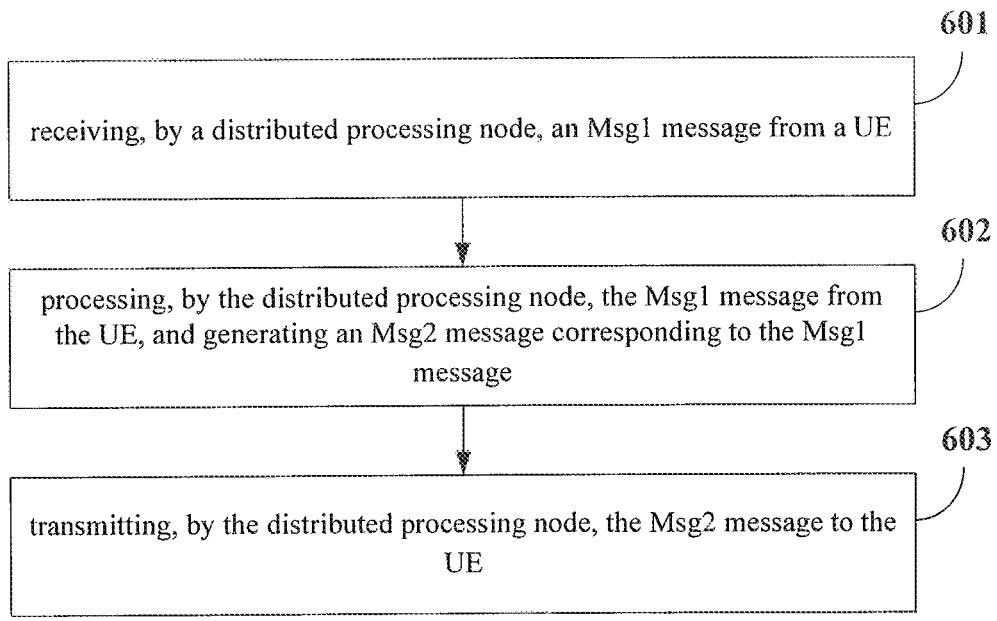
FIG. 6 is a flow chart of an access method for a radio network in some embodiments of the present disclosure.

The present disclosure further provides in some embodiments an access method, for a radio network which, as shown in FIG. 6, includes the following steps.

Step 601: receiving, by a distributed processing node, an Msg1 message from a UE, a content included in the Msg1 message being allocated through a random access resource allocation Msg0 message.

In the embodiments of the present disclosure, a node generating the Msg0 message may vary along with the content included in the Msg0 message. For the non-contention random access procedure triggered at an RRC layer, the Msg0 message may be generated by the centralized processing node, and for the non-contention random access procedure triggered at an MAC layer, the Msg0 message may be generated by the distributed processing node or the centralized processing node.

Step 602: processing, by the distributed processing node, the Msg1 message from the UE, and generating an Msg2 message corresponding to the Msg1 message, the Msg2 message including a temporary RNTI which is a currently-unused RNTI in a set of RNTIs available for the distributed processing node.

Step 603: transmitting, by the distributed processing node, the Msg2 message to the UE.

In some embodiments of the present disclosure, the set of RNTIs available for the distributed processing node may be determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

According to the access method in the embodiments of the present disclosure, it is able to perform the access procedure in the layered access network architecture, and provide a small access time delay for the access procedure.

Figure 7:
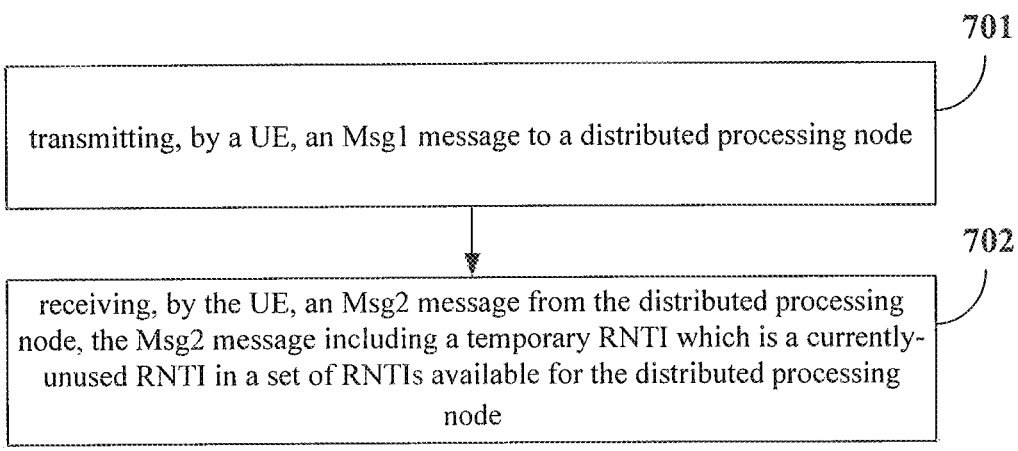
FIG. 7 is a flow chart of an access method for a radio network in some embodiments of the present disclosure.

The present disclosure further provides in some embodiments an access method for a radio network which, as shown in FIG. 7, includes: Step 701 of transmitting, by a UE, an Msg1 message to a distributed processing node, a content included in the Msg1 message being allocated through an Msg0 message; and Step 702 of receiving, by the UE, an Msg2 message from the distributed processing node, the Msg2 message including a temporary RNTI which is a currently-unused RNTI in a set of RNTIs available for the distributed processing node.

In some embodiments of the present disclosure, the access method further includes discarding, by the UE, the temporary RNTI included in the Msg2 message, and adopting a C-RNTI acquired based on the Msg0 message.

In some embodiments of the present disclosure, the set of RNTIs available for the distributed processing node may be determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

According to the access method in the embodiments of the present disclosure, it is able to perform the access procedure in the layered access network architecture, and provide a small access time delay for the access procedure.

In the embodiments of the present disclosure, an appropriate scenario may be that there exists for the UE an RNTI available for the data transmission. For example, the downlink data has arrived at the UE, but there is uplink out-of-synchronization and there is no dedicated preamble or synchronization sequence. For another example, the uplink data has arrived at the UE, but there is the uplink out-of-synchronization.

Figure 8:
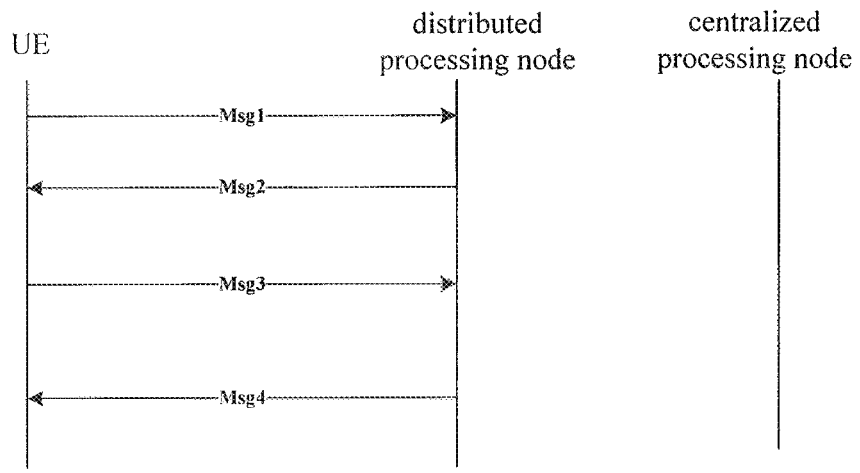
FIG. 8 is a schematic view showing a content random access procedure in some embodiments of the present disclosure.

FIG. 8 shows the content random access procedure, which may include the following steps.

Step 801: the UE may transmit the Msg1 message to, and terminated at, the distributed processing node. The content included in the Msg1 message may be, but not limited to, access-related code/sequence, and it may be allocated by the distributed to the UE. The code/sequence may be managed by the distributed processing node itself, or uniformly allocated and notified by the centralized processing node to the distributed processing nodes.

The codes/sequences for different distributed processing nodes are allowed to overlap each other. An access resource (e.g., a PRACH resource) adopted for the transmission of the Msg1 message may be allocated by the distributed processing node, or allocated and notified by the centralized processing node to the distributed processing node.

Step 802: the distributed processing node may process the Msg1 message from the UE, and generate the Msg2 message corresponding to the Msg1 message. The Msg2 message may be transmitted through physical layer signaling, or an L2 Protocol Data Unit (PDU). The content included in the Msg2 message may be the same as the content included in the Msg2 message in the LTE system in the related art. To be specific, the Msg2 message may include such information as a TA value corresponding to the UE, a resource for the uplink transmission of the Msg3 message, and the temporary RNTI.

A value of the temporary RNTI included in the Msg2 message may be associated with a conflict-free UE identifier management mode adopted by the centralized processing node. The conflict-free UE identifier management for an access network may be achieved through the centralized processing node. To be specific, there may exist the following two management modes.

Alternative management mode 1 (Alt1): the centralized processing node may determine the set of RNTIs available for the centralized processing node, and allocate a subset of the set to the distributed processing node managed by the centralized processing node as the set of RNTIs available for the distributed processing node. The sets of RNTIs for different distributed processing nodes managed by the same centralized processing node do not overlap each other.

Alternative management mode 2 (Alt2): the centralized processing node may determine the set of RNTIs available for the centralized processing node, and allocate a subset or an universal set of the set of RNTIs to the distributed processing node as the set of RNTIs available for the distributed processing node. The sets of RNTIs for different distributed processing nodes are allowed to overlap each other. The centralized processing node may uniquely identify one UE through the TRP ID and the RNTI.

It should be appreciated that, regardless of the management mode adopted by the centralized processing node, a same behavior may be made by the distributed processing node, i.e., the distributed processing node may select a currently-unused RNTI from the set of RNTIs available for the distributed processing node as the temporary RNTI for the UE.

Step 803: the UE may transmit the Msg3 message to the distributed processing node.

The content included in the Msg3 message may vary along with the purpose of the random access procedure. In this embodiment, the content included in the Msg3 message may be the RNTI MAC CE corresponding to the RNTI currently adopted by the UE for the data transmission.

Step 804: the distributed processing node may transmit the Msg4 message to the UE.

The distributed processing node may receive the Msg3 message, parse the Msg3 message, and notify the UE of the fact that the competition is successful through a C-RNTI-scrambled PRCCH, i.e., transmit the Msg4 message to the UE.

In some embodiments of the present disclosure, an appropriate scenario may be that there exists for the UE no RNTI for the data transmission, e.g., during the initial access or the RRC connection reestablishment.

Figure 9:
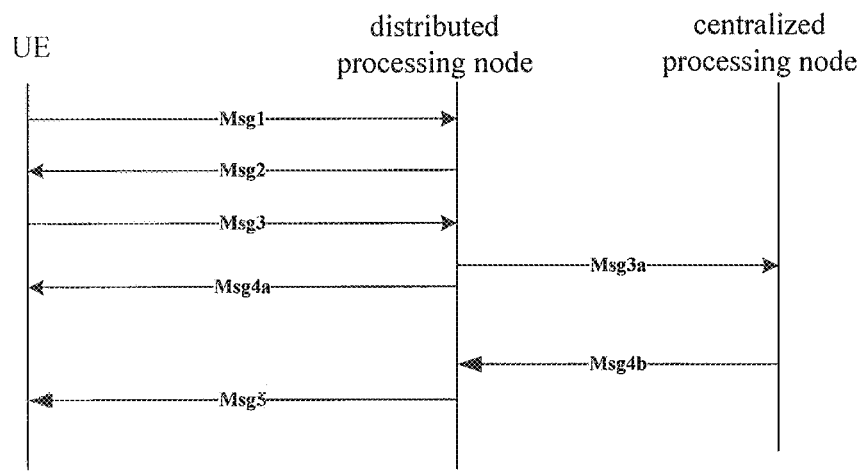
FIG. 9 is another schematic view showing the content random procedure in some embodiments of the present disclosure.

FIG. 9 shows a content random access procedure which may include the following steps.

Step 901: the UE may transmit the Msg1 message to, and terminated at, the distributed processing node. The content included in the Msg1 message may be, but not limited to, access-related code/sequence, and it may be allocated by the distributed to the UE. The code/sequence may be managed by the distributed processing node itself, or uniformly allocated and notified by the centralized processing node to the distributed processing nodes.

The codes/sequences for different distributed processing nodes are allowed to overlap each other. An access resource (e.g., a PRACH resource) adopted for the transmission of the Msg1 message may be allocated by the distributed processing node, or allocated and notified by the centralized processing node to the distributed processing node.

Step 902: the distributed processing node may transmit the Msg2 message to the UE.

The distributed processing node may process the Msg1 message from the UE, and generate the Msg2 message corresponding to the Msg1 message. The Msg2 message may be transmitted through physical layer signaling, or an L2 PDU. The content included in the Msg2 message may be the same as the content included in the Msg2 message in the LTE system in the related art. To be specific, the Msg2 message may include such information as a TA value corresponding to the UE, a resource for the uplink transmission of the Msg3 message, and the temporary RNTI.

In some embodiments of the present disclosure, a value of the temporary RNTI included in the Msg2 message may be associated with a conflict-free UE identifier management mode adopted by the centralized processing node. The conflict-free UE identifier management for an access network may be achieved through the centralized processing node. To be specific, there may exist the following two management modes.

Alternative management mode 1 (Alt1): the centralized processing node may determine the set of RNTIs available for the centralized processing node, and allocate a subset of the set to the distributed processing node managed by the centralized processing node as the set of RNTIs available for the distributed processing node. The sets of RNTIs for different distributed processing nodes managed by the same centralized processing node do not overlap each other.

Alternative management mode 2 (Alt2): the centralized processing node may determine the set of RNTIs available for the centralized processing node, and allocate a subset or an universal set of the set of RNTIs to the distributed processing node as the set of RNTIs available for the distributed processing node. The sets of RNTIs for different distributed processing nodes are allowed to overlap each other. The centralized processing node may uniquely identify one UE through the TRP ID and the RNTI.

It should be appreciated that, regardless of the management mode adopted by the centralized processing node, a same behavior may be made by the distributed processing node, i.e., the distributed processing node may select a currently-unused RNTI from the set of RNTIs available for the distributed processing node as the temporary RNTI for the UE.

Step 903: the UE may transmit the Msg3 message to the distributed processing node.

In this embodiment, the content included in the Msg3 message may vary along with the purpose of the random access procedure. The content included in the Msg3 message may be the content included in the RRC connection establishment/reestablishment request identification information (e.g., the CCCH SDU carried in the Msg3 message), i.e., an RRC connection establishment/reestablishment request.

Step 904, the distributed processing node may transmit the Msg4a message to the UE.

The distributed processing node may receive the Msg3 message and parse the Msg3 message. When the Msg3 message is decoded successfully (it is unnecessary to acquire the content included in the RRC connection establishment/reestablishment request identification information (e.g., the CCCH SDU carried in the Msg3 message)), the distributed processing node may determine that the competition is successful. At this time, the distributed processing node may transmit an MAC CE including the RRC connection establishment/reestablishment request identification information (e.g., the CCCH SDU carried in the Msg3 message) to the UE through the downlink data transmission scheduled by the PDCCH scrambled with the temporary RNTI. For the UE which has received the MAC CE, the content may be deemed to be performed successfully, and then the UE may wait to receive the RRC connection establishment/reestablishment message. For the UE which has transmitted the Msg3 message but fails to receive the MAC CE including the RRC connection establishment/reestablishment request identification information (e.g., the CCCH SDU carried in the Msg3 message) before the timeout of the contention resolution tinier, it may re-initiate the random access procedure as soon as possible based on the backoff mechanism.

Step 905: the distributed processing node may transmit the Msg3a message to the centralized processing node.

The distributed processing node needs to transmit the extracted RRC connection establishment/reestablishment request identification information (e.g., the CCCH SDU carried in the Msg3 message) to the centralized processing node while transmitting the Msg4a message to the UE.

Step 906: the centralized processing node may transmit the Msg4b message to the distributed processing node.

The centralized processing node may make a RRC connection establishment/reestablishment decision, and once the RRC connection is to be established/reestablished, transmit the Msg4b message to the distributed processing node, so as to indicate the UE to establish/reestablish the RRC connection.

Step 907: the distributed processing node may transmit the Msg5 message to the UE.

Based on the above alternative management mode 1 (Alt1), the RNTI for the subsequence data transmission may be determined in the following two modes.

Optional mode 1 (Option 1): when the Msg3 message includes the RRC connection establishment/reestablishment request identification information (e.g., the CCCH SDU carried in the Msg3 message), the UE may take the temporary RNTI as the RNTI for the subsequent data transmission once the content has been performed successfully.

Optional mode 2 (Option 2): when the Msg3 message includes the RRC connection establishment/reestablishment request identification information (e.g., the CCCH SDU carried in the Msg3 message), the UE which needs to access to a network may adopt the temporary RNTI before the receipt of the RRC connection establishment/reestablishment message. Once the UE has received the RRC connection establishment/reestablishment message transmitted by the centralized processing node through the distributed processing node, the UE may release the temporary RNTI, and take an RNTI carried in the RRC connection establishment/reestablishment message and allocated by a network side device for the UE as the RNTI adopted by the UE for the subsequent data transmission.

Based on the above-mentioned alternative management mode 2 (Alt2), the RNTI for the subsequent data transmission may be determined as follows. When the Msg3 message includes the RRC connection establishment/reestablishment request identification information (e.g., the CCCH SDU carried in the Msg3 message), the distributed processing node may notify the centralized processing node of the RRC connection establishment/reestablishment request identification information (e.g., the CCCH SDU carried in the Msg3 message) and, if necessary, the temporary RNTI via an interface between the distributed processing node and the centralized processing node. Next, the centralized processing node may take a combination of the temporary RNTI and the TRP ID of the distributed processing mode as an identifier of the UE in the centralized processing node. For the UE to access a network, when the RRC connection establishment/reestablishment message includes the newly-allocated RNTI, the UE may release the temporary RNTI and adopt the newly-allocated RNTI for the subsequent data transmission. Otherwise, the UE may take the temporary RNTI as a new RNTI for the subsequent data transmission.

It should be appreciated that, Steps 804, 805 and 806 may be performed in any order.

In some embodiments of the present disclosure, an appropriate scenario may be a handover scenario.

Figure 10:
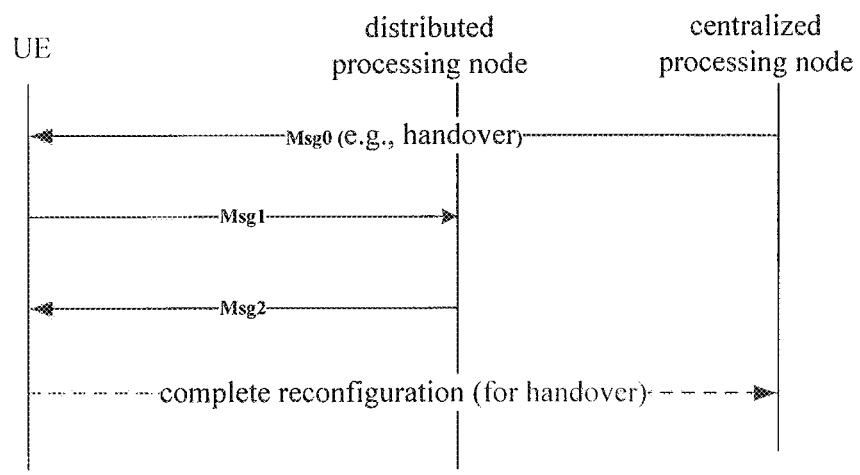
FIG. 10 is a schematic view showing a non-content random access procedure in some embodiments of the present disclosure.

FIG. 10 shows a ion-content random access procedure which may include the following steps.

Step 1001: the centralized processing node may transmit the Msg0 message to the UE.

In this embodiment, depending on the content included therein, the Msg0 message may be generated by different nodes. When the Msg0 message is RRC signaling, it may be generated by the centralized processing node, and when the Msg0 message is low-layer signaling, it may be generated by the distributed processing node.

In this embodiment, the Msg0 may be generated by the centralized processing node. The Msg0 message may include a dedicated access code/sequence or a dedicated access resource, which may be allocated by the distributed processing node itself, or uniformly allocated and notified by the centralized processing node to the distributed processing node. The codes/sequences for different distributed processing nodes are allowed to overlap each other.

Step 1002: the UE may transmit the Msg1 message to the distributed processing node.

The UE may transmit the Msg1 message to, and terminated at, the distributed processing node. The Msg1 message may include a dedicated code/sequence allocated for the Msg0 message. A resource for the transmission of the Msg1 message may be a dedicated access resource allocated for the Msg0 message.

Step 1003: the distributed processing node may transmit the Msg2 message to the UE.

The distributed processing node may process the Msg1 message from the UE, and generate the Msg2 message corresponding to the Msg1 message.

The content included in the Msg2 message may be the same as the content included in the Msg2 message in the LTE system in the related art. To be specific, the Msg2 message may include such information as a TA value corresponding to the UE, a resource for the uplink transmission of the Msg3 message, and the temporary RNTI.

A value of the temporary RNTI included in the Msg2 message may be associated with a conflict-free UE identifier management mode adopted by the centralized processing node. The conflict-free UE identifier management for an access network may be achieved through the centralized processing node. To be specific, there may exist the following two management modes.

Alternative management mode 1 (Alt1): the centralized processing node may determine the set of RNTIs available for the centralized processing node, and allocate a subset of the set to the distributed processing node managed by the centralized processing node as the set of RNTIs available for the distributed processing node. The sets of RNTIs for different distributed processing nodes managed by the same centralized processing node do not overlap each other.

Alternative management mode 2 (Alt2): the centralized processing node may determine the set of RNTIs available for the centralized processing node, and allocate a subset or an universal set of the set of RNTIs to the distributed processing node as the set of RNTIs available for the distributed processing node. The sets of RNTIs for different distributed processing nodes are allowed to overlap each other. The centralized processing node may uniquely identify one UE through the TRP ID and the RNTI.

It should be appreciated that, regardless of the management mode adopted by the centralized processing node, a same behavior may be made by the distributed processing node, i.e., the distributed processing node may select a currently-unused RNTI from the set of RNTIs available for the distributed processing node as the temporary RNTI for the UE.

In this embodiment, upon the receipt of the Msg2 message, the UE may discard the temporary RNTI, and still adopt the C-RNTI acquired through the Msg0 message.

In some embodiments of the present disclosure, an appropriate scenario may be the arrival of the downlink data with the uplink out-of-synchronization.

Figure 11:
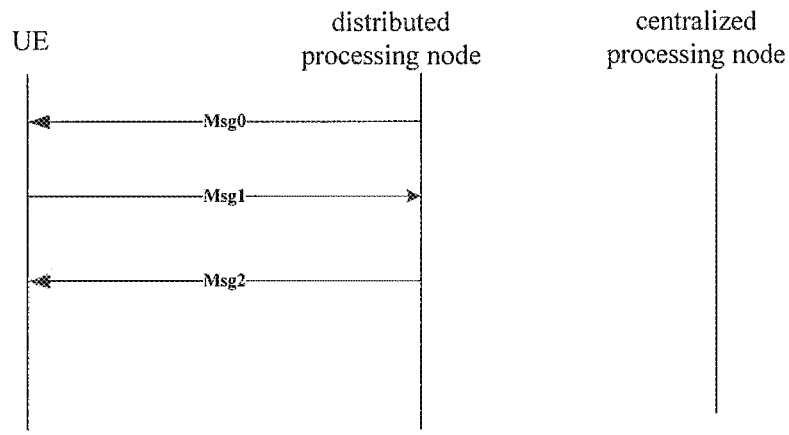
FIG. 11 is another schematic view showing the non-content random access procedure in some embodiments of the present disclosure.

FIG. 11 shows a non-contention random access procedure which may include the following steps.

Step 1001: the distributed, processing node may transmit the Msg0 message to the UE.

In this embodiment, depending on the content included therein, the Msg0 message may be generated by different nodes. When the Msg0 message is RRC signaling, it may be generated by the centralized processing node, and when the Msg0 message is low-layer signaling, it may be generated by the distributed processing node.

In this embodiment, the Msg0 may be generated by the distributed processing node. The Msg0 message may include a dedicated access code/sequence or a dedicated access resource, which may be allocated by the distributed processing node itself, or uniformly allocated and notified by the centralized processing node to the distributed processing node. The codes/sequences for different distributed processing nodes are allowed to overlap each other.

Step 1102: the UE may transmit the Msg1 message to the distributed processing node.

The UE may transmit the Msg1 message to, and terminated at, the distributed processing node. The Msg1 message may include a dedicated code/sequence allocated for the Msg0 message. A resource for the transmission of the Msg1 message may be a dedicated access resource allocated for the Msg0 message.

Step 1103: the distributed processing node may transmit the Msg2 message to the UE.

The distributed processing node ay process the Msg1 message from the UE, and generate the Msg2 message corresponding to the Msg1 message.

The content included in the Msg2 message may be the same as the content included in the Msg2 message in the LTE system in the related art. To be specific, the Msg2 message may include such information as a TA value corresponding to the UE, a resource for the uplink transmission of the Msg3 message, and the temporary RNTI.

A value of the temporary RNTI included in the Msg2 message may be associated with a conflict-free UE identifier management mode adopted by the centralized processing node. The conflict-free UE identifier management for an access network may be achieved through the centralized processing node. To be specific, there may exist the following two management modes.

Alternative management mode 1 (Alt1): the centralized processing node may determine the set of RNTIs available for the centralized processing node, and allocate a subset of the set to the distributed processing node managed by the centralized processing node as the set of RNTIs available for the distributed processing node. The sets of RNTIs for different distributed processing nodes managed by the same centralized processing node do not overlap each other.

Alternative management mode 2 (Alt2): the centralized processing node may determine the set of RNTIs available for the centralized processing node, and allocate a subset or an universal set of the set of RNTIs to the distributed processing node as the set of RNTIs available for the distributed processing node. The sets of RNTIs for different distributed processing nodes are allowed to overlap each other. The centralized processing node may uniquely identify one UE through the TRP ID and the RNTI.

It should be appreciated that, regardless of the management mode adopted by the centralized processing node, a same behavior may be made by the distributed processing node, i.e., the distributed processing node may select a currently-unused RNTI from the set of RNTIs available for the distributed processing node as the temporary RNTI for the UE.

In this embodiment, upon the receipt of the Msg2 message, the UE may discard the temporary RNTI, and still adopt the C-RNTI acquired through the Msg0 message.

Figure 12:
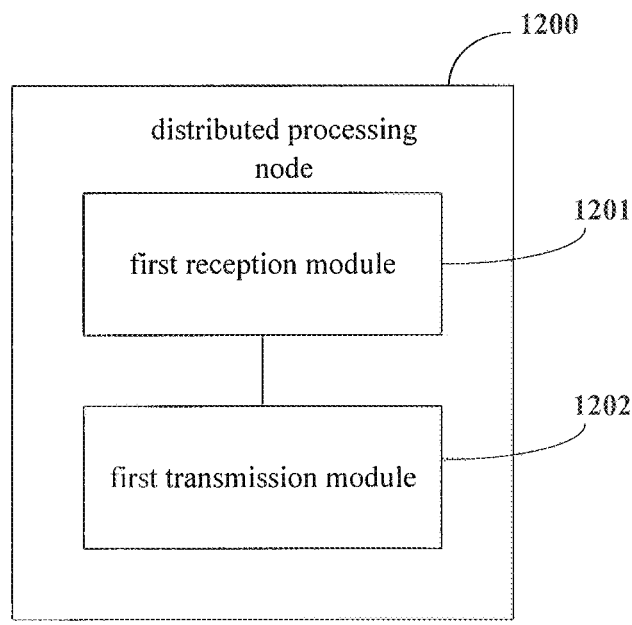
FIG. 12 is a block diagram of a distributed processing node in some embodiments of the present disclosure.

The present disclosure further provides in some embodiments a distributed processing node 1200 which, as shown in FIG. 12, includes: a first reception module 1201 configured to receive an Msg1 message from a UE, the Msg1 message including a dedicated access code or sequence; and a first transmission module 1202 configured to transmit an Msg2 message configured to respond to the Msg1 message to the UE, the Msg2 message including a temporary RNTI which is a currently-unused RNTI in a set of RNTIs available for the distributed processing node.

In some embodiments of the present disclosure, the distributed processing node further includes: a second reception module configured to receive an Msg3 message from the UE, the Msg3 message including a content corresponding to a random access reason; and a processing module configured to parse the Msg3 message, and perform treatment based on a parsing result.

In some embodiments of the present disclosure, the processing module is further configured to: parse the Msg3 message, the Msg3 message including an RNTI MAC CE corresponding to an RNTI currently adopted by the UE for the data transmission; and transmit an Msg4 message to the UE, the Msg4 message being addressed through the RNTI.

In some embodiments of the present disclosure, the processing module is further configured to: parse the Msg3 message, the Msg3 message including RRC connection establishment/reestablishment request identification information; transmit an Msg4a message to the UE, the Msg4a message including the RRC connection establishment/reestablishment request identification information; transmit an Msg3a message to a centralized processing node, the Msg3a message including the RRC connection establishment/reestablishment request identification information; receive an Msg4b message configured to respond to the Msg3a message from the centralized processing node; and transmit an Msg5 message configured to respond to the Msg3 message to the UE.

In some embodiments of the present disclosure, the set of RNTIs available for the distributed processing node may be determined in the following modes. Mode 1: the centralized processing node may determine a set of RNTIs available for the centralized processing node, and allocate a subset of the set of RNTIs to each distributed processing node managed by the centralized processing node as the set of RNTIs available for the distributed processing node. Sets of RNTIs available for different distributed processing nodes managed by the centralized processing node do not overlap each other. Mode 2: the centralized processing node may determine a set of RNTIs available for the centralized processing node, and allocate a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, based on the above determination mode 2, the distributed processing node further includes a notification module configured to, when the Msg3 message includes the RRC connection establishment/reestablishment request identification information, notify the centralized processing node of the RRC connection establishment/reestablishment request identification information and the temporary RNTI via an interface between the distributed processing node and the centralized processing node, so that the centralized processing node takes a combination of the temporary RNTI and a TRP ID of the distributed processing mode as an identifier of the UE in the centralized processing node.

Figure 13:
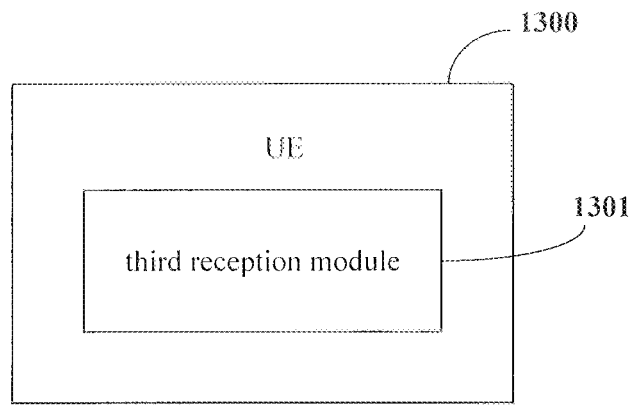
FIG. 13 is a block diagram of a UE in some embodiments of the present disclosure.

The present disclosure further provides in some embodiments a UE 1300 which, as shown in FIG. 13, includes a third reception module 1301 configured to receive an Msg2 message from a distributed processing node, the Msg2 message including a temporary RNTI which is a currently-unused RNTI in a set of RNTIs available for the distributed processing node.

In some embodiments of the present disclosure, the UE further includes: a second transmission module configured to transmit an Msg3 message to the distributed processing node, the Msg3 message including an RNTI MAC CE corresponding to an RNTI currently adopted by the UE for the data transmission; and a fourth reception module configured to receive an Msg4 message from the distributed processing node, the Msg4 message being addressed through the RNTI.

In some embodiments of the present disclosure, the UE further includes: a third transmission module configured to transmit the Msg3 message to the distributed processing node, the Msg3 message including RRC connection establishment/reestablishment request identification information; a fifth reception module configured to, when the UE has received an Msg4a message from the distributed processing node within a predetermined time period and the Msg4a message includes the RRC connection establishment/reestablishment request identification information transmitted by the UE in the Msg3 message, determine that the competition is successful; a sixth reception module configured to receive an Msg5 message configured to respond to the RRC connection establishment/reestablishment request identification information in the Msg3 message from the distributed processing node; and an re-initiation module configured to, when the UE fails to receive an Msg4a message from the distributed processing node within the predetermined time period, re-initiate a random access procedure.

In some embodiments of the present disclosure, the set of RNTIs available for the distributed processing node may be determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node. Sets of RNTIs available for different distributed processing nodes managed by the centralized processing node do not overlap each other.

In some embodiments of the present disclosure, based on the above determination mode, the UE further includes an RNTI selection module configured to: when the Msg3 message includes the RRC connection establishment/reestablishment request identification information and the UE has determined that the competition is successful based on the Msg4a, take the temporary RNTI as an RNTI for the subsequent data transmission; or when the Msg3 message includes the RRC connection establishment/reestablishment request identification information, enable the UE to adopt the temporary RNTI prior to the reception of the an RRC connection establishment/reestablishment message; and when the UE has received the RRC connection establishment/reestablishment message transmitted by the centralized processing node through the distributed processing node, release the temporary RNTI, and take an RNTI allocated by a network side device for the UE in the RRC connection establishment/reestablishment message as an RNTI adopted by the UE for the subsequent data transmission.

In some embodiments of the present disclosure, the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, based on the above determination mode, the UE further includes: a fifth transmission module configured to receive the RRC connection establishment/reestablishment message transmitted by the centralized processing node through the distributed processing node; a releasing module configured to, when the RRC connection establishment/reestablishment message includes a newly-allocated RNTI, release the temporary RNTI, and take the newly-allocated RNTI as the RNTI adopted by the UE for the subsequent data transmission; and an updating module configured to, when the RRC connection establishment/reestablishment message does not include any newly-allocated RNTI take the temporary RNTI as a new RNTI, and take the new RNTI as the RNTI adopted by the UE for the subsequent data transmission.

Figure 14:
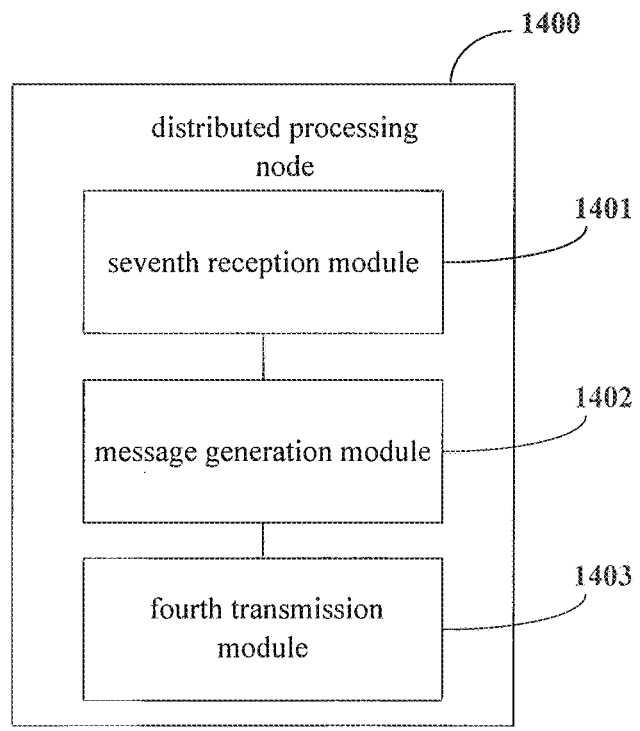
FIG. 14 is another block diagram of the distributed processing node in some embodiments of the present disclosure.

The present disclosure further provides in some embodiments a distributed processing node 1400 which, as shown in FIG. 14, includes: a seventh reception module 1401 configured to receive an Msg1 message from a UE, a content included in the Msg1 message being allocated through an Msg0 message; a message generation module 1402 configured to process the Msg1 message from the UE, and generate an Msg2 message corresponding to the Msg1 message, the Msg2 message including a temporary RNTI which is a currently-unused RNTI in a set of RNTIs available for the distributed processing node; and a fourth transmission module 1403 configured to transmit the Msg2 message to the UE.

In some embodiments of the present disclosure, the set of RNTIs available for the distributed processing node may be determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

In some embodiments of the present disclosure, the Msg0 message may be generated by the centralized processing node or the distributed processing node.

Figure 15:
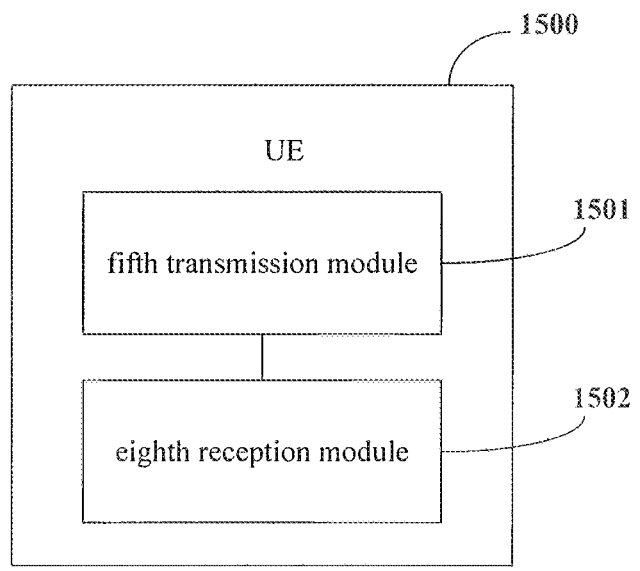
FIG. 15 is another block diagram of the UE in some embodiments of the present disclosure.

The present disclosure further provides in some embodiments a UE 1500 which, as shown in FIG. 15 includes: a fifth transmission module 1501 configured to transmit an Msg1 message to a distributed processing node, a content included in the Msg1 message being allocated through an Msg0 message; and an eighth reception module 1502 configured to receive an Msg2 message from the distributed processing node, the Msg2 message including a temporary RNTI which is a currently-unused RNTI in a set of RNTIs available for the distributed processing node.

In some embodiments of the present disclosure, the UE further includes a discarding module configured to discard the temporary RNTI included in the Msg2 message, and adopt a C-RNTI acquired based on the Msg0 message.

In some embodiments of the present disclosure, the set of RNTIs available for the distributed processing node may be determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

Figure 16:
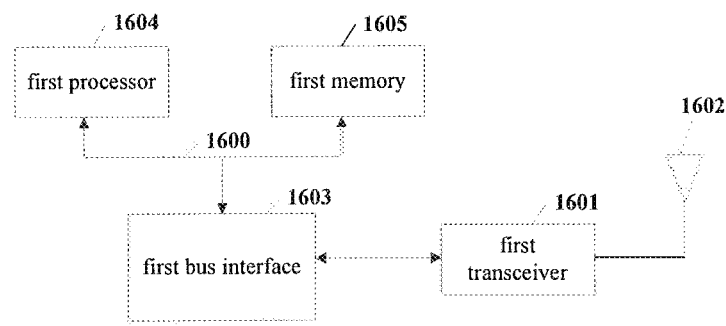
FIG. 16 is yet another block diagram of the distributed processing node in some embodiments of the present disclosure.

The present disclosure further provides in some embodiments a distributed processing node which, as shown in FIG. 16, includes a first processor 1604, a first memory 1605 and a first transceiver 1601. The first processor 1604 is configured to read a program stored in the first memory 1605. The first transceiver 1601 is configured to receive and transmit data under the control of the first processor 1604. To be specific, the first transceiver 1601 is configured to: receive an Msg1 message from a UE, the Msg1 message including a dedicated access code or sequence; and transmit an Msg2 message configured to respond to the Msg1 message to the UE, the Msg2 message including a temporary RNTI which is a currently-unused RNTI in a set of RNTIs available for the distributed processing node.

In FIG. 16, bus architecture (represented by a first bus 1600) may include a number of buses and bridges connected to each other, so as to connect various circuits for one or more first processors 1604 and one or more first memories 1605. In addition, as is known in the art, the first bus 1600 may be used to connect any other circuits, such as a circuit for a peripheral device, a circuit for a voltage stabilizer and a power management circuit, which will not be particularly defined herein. A bus interface 1603 may be provided between the first bus 1600 and the first transceiver 1601, and the first transceiver 1601 may consist of one or more elements, e.g., a transmitter and a receiver for communication with any other devices over a transmission medium. Data processed by the first processor 1604 may be transmitted on a radio medium through the first transceiver 1601 and a first antenna 1602. Further, the first antenna 1602 may be further configured to receive data and transmit the data to the first processor 1604 via the first transceiver 1601.

The first processor 1604 may take charge of managing the first bus 1600 as well general processing, and may further provide various functions such as timing, peripheral interfacing, voltage adjustment, power source management and any other control functions. The first memory 1605 may store therein data for the operation of the first processor 1604. To be specific, the first processor 1604 may be a Central Processing Unit (CPU), an Application Specific Integrated Circuit (ASIC), a Field-Programmable Gate Array (FPGA) or a Complex Programmable Logic Device (CPLD).

In some embodiments of the present disclosure, the first processor 1604 is further configured to: control the first transceiver 1601 to receive an Msg3 message from the UE, the Msg3 message including a content corresponding to a random access reason; and parse the Msg3 message, and perform treatment based on a parsing result.

In some embodiments of the present disclosure, the first processor 1604 is further configured to: parse the Msg3 message, the Msg3 message including an RNTI MAC CE corresponding to an RNTI currently adopted by the UE for the data transmission; and transmit an Msg4 message to the UE, the Msg4 message being addressed through the RNTI.

In some embodiments of the present disclosure, the first processor 1604 is further configured to: parse the Msg3 message, the Msg3 message including RRC connection establishment/reestablishment request identification information; transmit an Msg4a message to the UE, the Msg4a message including the RRC connection establishment/reestablishment request identification information; transmit an Msg3a message to a centralized processing node, the Msg3a message including the RRC connection establishment/reestablishment request identification information; receive an Msg4b message configured to respond to the Msg3a message from the centralized processing node; and transmit an Msg5 message configured to respond to the Msg3 message to the UE.

In some embodiments of the present disclosure, the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node. Sets of RNTIs available for different distributed processing nodes managed by the centralized processing node do not overlap each other.

In some embodiments of the present disclosure, the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, when the Msg3 message includes the RRC connection establishment/reestablishment request identification information, the first processor 1604 is further configured to control the first transceiver 1601 to notify the centralized processing node of the RRC connection establishment/reestablishment request identification information and the temporary RNTI via an interface between the distributed processing node and the centralized processing node, so that the centralized processing node takes a combination of the temporary RNTI and a TRP ID of the distributed processing mode as an identifier of the UE in the centralized processing node.

Figure 17:
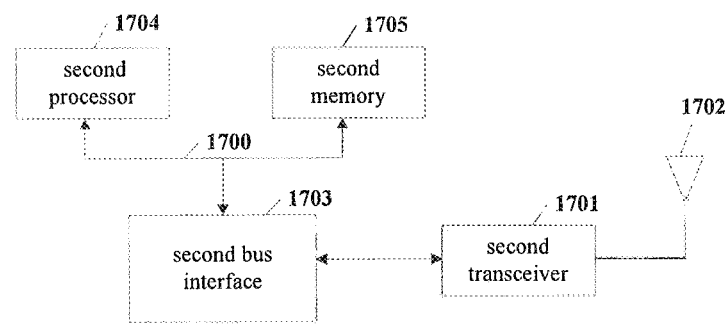
FIG. 17 is yet another block diagram of the UE in some embodiments of the present disclosure.

The present disclosure further provides in some embodiments a UE which, as shown in FIG. 17, includes a second processor 1704, a second memory 1705 and a second transceiver 1701. The second processor 1704 is configured to read a program stored in the second memory 1705. The second transceiver 1701 is configured to receive and transmit data under the control of the second processor 1704. To be specific, the second transceiver 1701 is configured to receive an Msg2 message from a distributed processing node. The Msg2 message includes a temporary RNTI which is a currently-unused RNTI in a set of RNTIs available for the distributed processing node.

In FIG. 17, bus architecture (represented by a second bus 1700) may include a number of buses and bridges connected to each other, so as to connect various circuits for one or more second processors 1704 and one or more second memories 1705. In addition, as is known in the art, the second bus 1700 may be used to connect any other circuits, such as a circuit for a peripheral device, a circuit for a voltage stabilizer and a power management circuit, which will not be particularly defined herein. A bus interface 1703 may be provided between the second bus 1700 and the second transceiver 1701, and the second transceiver 1701 may consist of one or more elements, e.g., a transmitter and a receiver for communication with any other devices over a transmission medium. Data processed by the second processor 1704 may be transmitted on a radio medium through the second transceiver 1701 and a second antenna 1702, Further, the second antenna 1702 may be further configured to receive data and transmit the data to the second processor 1704 via the second transceiver 1701.

The second processor 1704 may take charge of managing the second bus 1700 as well general processing, and may further provide various functions such as timing, peripheral interfacing, voltage adjustment, power source management and any other control functions. The second memory 1705 may store therein data for the operation of the second processor 1704, To be specific, the second processor 1704 may be a CPU, an ASIC, an FPGA or a CPLD.

In some embodiments of the present disclosure, the second processor 1704 is further configured to: control the second transceiver 1701 to transmit an Msg3 message to the distributed processing node, the Msg3 message including an RNTI MAC CE corresponding to an RNTI currently adopted by the UE for the data transmission; and a fourth reception module configured to receive an Msg4 message from the distributed processing node, the Msg4 message being addressed through the RNTI.

In some embodiments of the present disclosure, the second processor 1704 is further configured to: control the second transceiver 1701 to transmit the Msg3 message to the distributed processing node, the Msg3 message including RRC connection establishment/reestablishment request identification information; when the UE has received an Msg4a message from the distributed processing node within a predetermined time period and the Msg4a message includes the RRC connection establishment/reestablishment request identification information transmitted by the UE in the Msg3 message, determine that the competition is successful; receive an Msg5 message configured to respond to the RRC connection establishment/reestablishment request identification information in the Msg3 message from the distributed processing node; and when the UE fails to receive an Msg4a message from the distributed processing node within the predetermined time period, re-initiate a random access procedure.

In some embodiments of the present disclosure, the set of RNTIs available for the distributed processing node may be determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node. Sets of RNTIs available for different distributed processing nodes managed by the centralized processing node do not overlap each other.

In some embodiments of the present disclosure, the second processor 1704 is further configured to: when the Msg3 message includes the RRC connection establishment/reestablishment request identification information and the UE has determined that the competition is successful based on the Msg4a, take the temporary RNTI as an RNTI for the subsequent data transmission; or when the Msg3 message includes the RRC connection establishment/reestablishment request identification information, enable the UE to adopt the temporary RNTI prior to the reception of the an RRC connection establishment/reestablishment message; and when the UE has received the RRC connection establishment/reestablishment message transmitted by the centralized processing node through the distributed processing node, release the temporary RNTI, and take an RNTI allocated by a network side device for the UE in the RRC connection establishment/reestablishment message as an RNTI adopted by the UE for the subsequent data transmission.

In some embodiments of the present disclosure, the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node. Sets of RNTIs available for different distributed processing nodes are allowed to overlap each other.

In some embodiments of the present disclosure, the second processor 1704 is further configured to: control the second transceiver 1701 to receive the RRC connection establishment/reestablishment message transmitted by the centralized processing node through the distributed processing node; when the RRC connection establishment/reestablishment message includes a newly-allocated RNTI, release the temporary RNTI, and take the newly-allocated RNTI as the RNTI adopted by the UE for the subsequent data transmission; and when the RRC connection establishment/reestablishment message does not include any newly-allocated RNTI, take the temporary RNTI as a new RNTI, and take the new RNTI as the RNTI adopted by the UE for the subsequent data transmission.

Figure 18:
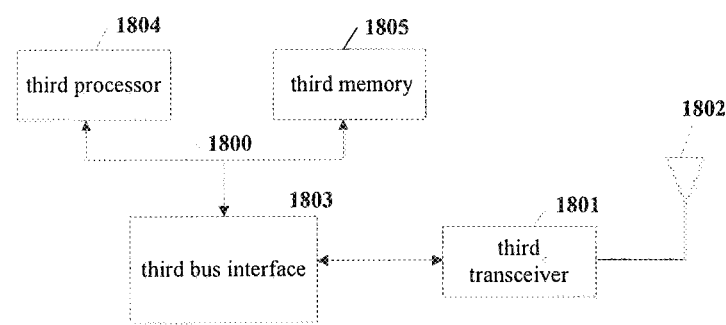
FIG. 18 is still yet another block diagram of the distributed processing node in some embodiments of the present disclosure.

The present disclosure further provides in some embodiments a distributed processing node which, as shown in FIG. 18, includes a third processor 1804, a third memory 1805 and a third processor 1804. The third transceiver 1801 is configured to receive and transmit data under the control of the third processor 1804. To be specific, the third transceiver 1801 is configured to: receive an Msg1 message from a UE, a content included in the Msg1 message being allocated through an Msg0 message; and transmit an Msg2 message to the UE. The third processor 1804 is configured to read a program stored in the third memory 1805, so as to process the Msg1 message from the UE, and generate the Msg2 message corresponding to the Msg1 message. The Msg2 message includes a temporary RNTI which is a currently-unused RNTI in a set of RNTIs available for the distributed processing node.

In FIG. 18, bus architecture (represented by a third bus 1800) may include a number of buses and bridges connected to each other, so as to connect various circuits for one or more third processors 1804 and one or more third memories 1805. In addition, as is known in the art, the third bus 1800 may be used to connect any other circuits, such as a circuit for a peripheral device, a circuit for a voltage stabilizer and a power management circuit, which will not be particularly defined herein. A bus interface 1803 may be provided between the third bus 1800 and the third transceiver 1801, and the third transceiver 1801 may consist of one or more elements, e.g., a transmitter and a receiver for communication with any other devices over a transmission medium. Data processed by the third processor 1804 may be transmitted on a radio medium through the third transceiver 1801 and a third antenna 1802. Further, the third antenna 1802 may be further configured to receive data and transmit the data to the third processor 1804 via the third transceiver 1801.

The third processor 1804 may take charge of managing the third bus 1800 as well general processing, and may further provide various functions such as timing, peripheral interfacing, voltage adjustment, power source management and any other control functions. The third memory 1805 may store therein data for the operation of the third processor 1804. To be specific, the third processor 1804 may be a CPU, an ASIC, an FPGA or a CPLD.

In some embodiments of the present disclosure, the set of RNTIs available for the distributed processing node may be determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

In some embodiments of the present disclosure, the Msg0 message may be generated by the centralized processing node or the distributed processing node.

Figure 19:
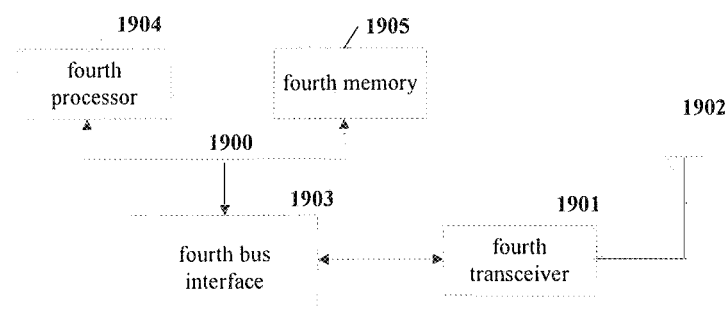
FIG. 19 is still yet another block diagram of the UE in some embodiments of the present disclosure.

The present disclosure further provides in some embodiments a UE which, as shown in FIG. 19, includes a fourth processor 1904, a fourth memory 1905 and a fourth transceiver 1901. The fourth processor 1904 is configured to read a program stored in the memory 1905. The fourth transceiver 1901 is configured to receive and transmit data under the control of the fourth processor 1904. To be specific, the fourth transceiver 1901 is configured to: transmit an Msg1 message to a distributed processing node, a content included in the Msg1 message being allocated through an Msg0 message; and receive an Msg2 message from the distributed processing node, the Msg2 message including a temporary RNTI which is a currently-unused RNTI in a set of RNTIs available for the distributed processing node.

In FIG. 19, bus architecture (represented by a fourth bus 1900) may include a number of buses and bridges connected to each other, so as to connect various circuits for one or more fourth processors 1904 and one or more fourth memories 1905. In addition, as is known in the art, the fourth bus 1900 may be used to connect any other circuits, such as a circuit for a peripheral device, a circuit for a voltage stabilizer and a power management circuit, which will not be particularly defined herein. A bus interface 1903 may be provided between the fourth bus 1900 and the fourth transceiver 1901, and the fourth transceiver 1901 may consist of one or more elements, e.g., a transmitter and a receiver for communication with any other devices over a transmission medium, Data processed by the fourth processor 1904 may be transmitted on a radio medium through the fourth transceiver 1901 and a fourth antenna 1902. Further, the fourth antenna 1902 may be further configured to receive data and transmit the data to the fourth processor 1904 via the fourth transceiver 1901.

The fourth processor 1904 may take charge of managing the fourth bus 1900 as well general processing, and may further provide various functions such as timing, peripheral interfacing, voltage adjustment, power source management and any other control functions. The fourth memory 1905 may store therein data for the operation of the fourth processor 1904. To be specific, the fourth processor 1904 may be a CPU, an ASIC, an FPGA or a CPLD.

In some embodiments of the present disclosure, the fourth processor 1904 is further configured to discard the temporary RNTI included in the Msg2 message, and adopt a C-RNTI acquired based on the Msg0 message.

In some embodiments of the present disclosure, the set of RNTIs available for the distributed processing node may be determined through determining, by a centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or the set of RNTIs available for the distributed processing node may be determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

It should be appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the steps shall not be used to define the order of the steps, and instead, the order of the steps shall be determined based on their functions and internal logics.

In addition, the terms "system" and "network" may be replaced with each other. The expression "and/or" is merely used to describe the relationship between objects, and it includes three relationships. For example, "A and/or B" may represent that, there is only A, there are both A and B, and there is only B. Further, the symbol "/" usually refers to "or".

It should be further appreciated that, the expression "B corresponding to A" means that B is associated with A and may be determined based on A. However, when B is determined based on A, it means that B may be determined based on A and/or any other information.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An access method for a radio network, applied to a layered network architecture, wherein the layered network architecture comprises a distributed processing node and a centralized processing node, wherein the access method comprises:
  receiving, by the distributed processing node, an Msg1 message from a User Equipment (UE), the Msg1 message comprising a dedicated access code or sequence; and
  transmitting, by the distributed processing node, an Msg2 message configured to respond to the Msg1 message to the UE, the Msg2 message comprising a temporary Radio Network Temporary Identifier (RNTI) which is a currently-unused RNTI in a set of RNTIs available for the distributed processing node;
  wherein the distributed processing node is not a complete base station but a distributed unit (DU) of a base station which is divided in a central unit (CU) and the DU; the DU performs only a part of functions of the base station; in view of delay, RNTI allocation function of the CU is transferred to the DU, and the RNTI is allocated by the DU.

2. The access method according to claim 1, wherein subsequent to the transmitting, by the distributed processing node, the Msg2 message configured to respond to the Msg1 message to the UE, the access method further comprises:
  receiving, by the distributed processing node, an Msg3 message from the UE, the Msg3 message comprising a content corresponding to a random access reason; and
  parsing, by the distributed processing node, the Msg3 message, and performing a treatment based on a parsing result.

3. The access method according to claim 2, wherein the parsing, by the distributed processing node, the Msg3 message and performing the treatment based on the parsing result comprises:
  parsing, by the distributed processing node, the Msg3 message, the Msg3 message comprising an RNTI Medium Access Control (MAC) Control Element (CE) corresponding to an RNTI currently adopted by the UE for the data transmission; and transmitting, by the distributed processing node, an Msg4 message to the UE, the Msg4 message being addressed through the RNTI;

or the parsing, by the distributed processing node, the Msg3 message and performing the treatment based on the parsing result comprises:

parsing, by the distributed processing node, the Msg3 message, the Msg3 message comprising Radio Resource Control (RRC) connection establishment/re-establishment request identification information;

transmitting, by the distributed processing node, an Msg4a message to the UE, the Msg4a message comprising the RRC connection establishment/reestablishment request identification information;

transmitting, by the distributed processing node, an Msg3a message to the centralized processing node, the Msg3a message comprising the RRC connection establishment/reestablishment request identification information;

receiving, by the distributed processing node, an Msg4b message configured to respond to the Msg3a message from the centralized processing node; and transmitting, by the distributed processing node, an Msg5 message configured to respond to the Msg3 message to the UE.

4. The access method according to claim 1, wherein the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node, wherein sets of RNTIs available for different distributed processing nodes managed by the centralized processing node do not overlap each other.

5. The access method according to claim 1, wherein the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, wherein sets of RNTIs available for different distributed processing nodes are allowed to overlap each other.

6. The access method according to claim 5, further comprising, when the Msg3 message comprises the RRC connection establishment/reestablishment request identification information, notifying, by the distributed processing node, the centralized processing node of the RRC connection establishment/reestablishment request identification information and the temporary RNTI via an interface between the distributed processing node and the centralized processing node, so that the centralized processing node takes a combination of the temporary RNTI and a Transmission Reception Point (TRP) Identity (ID) of the distributed processing mode as an identifier of the UE in the centralized processing node.

7. An access method for a radio network, applied to a layered network architecture, wherein the layered network architecture comprises a distributed processing node and a centralized processing node, wherein the access method comprises:

transmitting, by a UE, an Msg1 message to the distributed processing node, receiving, by the UE, an Msg2 message from the distributed processing node, wherein the Msg2 message comprises a temporary RNTI which is a currently-unused RNTI in a set of RNTIs available for the distributed processing node;

wherein the distributed processing node is not a complete base station but a distributed unit (DU) of a base station which is divided in a central unit (CU) and the DU; the DU performs only a part of functions of the base station; in view of delay, RNTI allocation function of the CU is transferred to the DU, and the RNTI is allocated by the DU.

8. The access method according to claim 7, further comprising:

transmitting, by the UE, an Msg3 message to the distributed processing node, the Msg3 message comprising an RNTI MAC CE corresponding to an RNTI currently adopted by the UE for the data transmission; and receiving, by the UE, an Msg4 message from the distributed processing node, the Msg4 message being addressed through the RNTI;

or the method further comprises:

transmitting, by the UE, the Msg3 message to the distributed processing node, the Msg3 message comprising RRC connection establishment/reestablishment request identification information;

when the UE has received an Msg4a message from the distributed processing node within a predetermined time period and the Msg4a message comprises the RRC connection establishment/reestablishment request identification information transmitted by the UE in the Msg3 message, determining that a competition is successful;

receiving, by the UE, an Msg5 message configured to respond to the RRC connection establishment/reestablishment request identification information in the Msg3 message from the distributed processing node; and when the UE fails to receive an Msg4a message from the distributed processing node within the predetermined time period, re-initiating, by the UE, a random access procedure.

9. The access method according to claim 7, wherein the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node, wherein sets of RNTIs available for different distributed processing nodes managed by the centralized processing node do not overlap each other.

10. The access method according to claim 9, further comprising:

when the Msg3 message comprises the RRC connection establishment/reestablishment request identification information and the UE has determined that the competition is successful based on the Msg4a, taking, by the UE, the temporary RNTI as an RNTI for the subsequent data transmission; or when the Msg3 message comprises the RRC connection establishment/reestablishment request identification information, enabling the UE to adopt the temporary RNTI prior to the reception of the an RRC connection establishment/reestablishment message; and when the UE has received the RRC connection establishment/reestablishment message transmitted by the centralized processing node through the distributed processing node, releasing, by the UE, the temporary RNTI, and taking an RNTI allocated by a network side device for the UE in the RRC connection establishment/reestablishment message as an RNTI adopted by the UE for the subsequent data transmission.

11. The access method according to claim 7, wherein the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, wherein sets of RNTIs available for different distributed processing nodes are allowed to overlap each other.

12. The access method according to claim 11, wherein when the Msg3 message comprises the RRC connection establishment/reestablishment request identification information, the access method further comprises:
  receiving, by the UE, the RRC connection establishment/reestablishment message transmitted by the centralized processing node through the distributed processing node;
  when the RRC connection establishment/reestablishment message comprises a newly-allocated RNTI, releasing, by the UE, the temporary RNTI, and taking the newly-allocated RNTI as the RNTI adopted by the UE for the subsequent data transmission; and
  when the RRC connection establishment/reestablishment message does not comprise any newly-allocated RNTI, taking, by the UE, the temporary RNTI as a new RNTI, and taking the new RNTI as the RNTI adopted by the UE for the subsequent data transmission.

13. An access method for a radio network, applied to a layered network architecture, wherein the layered network architecture comprises a distributed processing node and a centralized processing node, wherein the access method comprises:
  receiving, by the distributed processing node, an Msg1 message from a UE, a content comprised in the Msg1 message being allocated through a random access resource allocation Msg0 message;
  processing, by the distributed processing node, the Msg1 message from the UE, and generating an Msg2 message corresponding to the Msg1 message, the Msg2 message comprising a temporary RNTI which is a currently-unused RNTI in a set of RNTIs available for the distributed processing node; and
  transmitting, by the distributed processing node, the Msg2 message to the UE;
  wherein the distributed processing node is not a complete base station but a distributed unit (DU) of a base station which is divided in a central unit (CU) and the DU; the DU performs only a part of functions of the base station; in view of delay, RNTI allocation function of the CU is transferred to the DU, and the RNTI is allocated by the DU.

14. The access method according to claim 13, wherein the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or
  the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

15. The access method according to claim 13, wherein the Msg0 message is generated by the centralized processing node or the distributed processing node.

16. An access method for a radio network, applied to a layered network architecture, wherein the layered network architecture comprises a distributed processing node and a centralized processing node, wherein the access method comprises:
  transmitting, by a UE, an Msg1 message to the distributed processing node, a content comprised in the Msg1 message being allocated through an Msg0 message for a random access resource allocation; and
  receiving, by the UE, an Msg2 message from the distributed processing node, the Msg2 message comprising a temporary RNTI which is a currently-unused RNTI in a set of RNTIs available for the distributed processing node;
  wherein the distributed processing node is not a complete base station but a distributed unit (DU) of a base station which is divided in a central unit (CU) and the DU; the DU performs only a part of functions of the base station; in view of delay, RNTI allocation function of the CU is transferred to the DU, and the RNTI is allocated by the DU.

17. The access method according to claim 16, further comprising discarding, by the UE, the temporary RNTI comprised in the Msg2 message, and adopting a Cell-Radio Network Temporary Identifier (C-RNTI) acquired based on the Msg0 message.

18. The access method according to claim 16, wherein the set of RNTIs available for the distributed processing node is determined through determining, by the centralized processing node, a set of RNTIs available for the centralized processing node, and allocating, by the centralized processing node, a subset of the set of RNTIs to each distributed processing node managed by the centralized processing node as the set of RNTIs available for the distributed processing node, and sets of RNTIs available for different distributed processing nodes managed by the centralized processing node do not overlap each other; or
  the set of RNTIs available for the distributed processing node is determined through determining, by the centralized processing node, a set of RNTIs available for the centralized processing node, and allocating, by the centralized processing node, a subset or a universal set of the set of RNTIs to each distributed processing node managed by the centralized processing node as the set of RNTIs available for the distributed processing node, and sets of RNTIs available for different distributed processing nodes are allowed to overlap each other.

19. A UE, comprising a processor, a memory and a transceiver,
    wherein the processor is configured to read a program stored in the memory to perform the access method for the radio network according to claim 7.

20. A UE, comprising a processor, a memory and a transceiver,
    wherein the processor is configured to read a program stored in the memory to perform the access method for the radio network according to claim 16.

\* \* \* \* \*